June 12, 1923.                     A. WESTGARD                     1,458,671
                                  SAW CONSTRUCTION
                                Filed Dec. 31, 1921
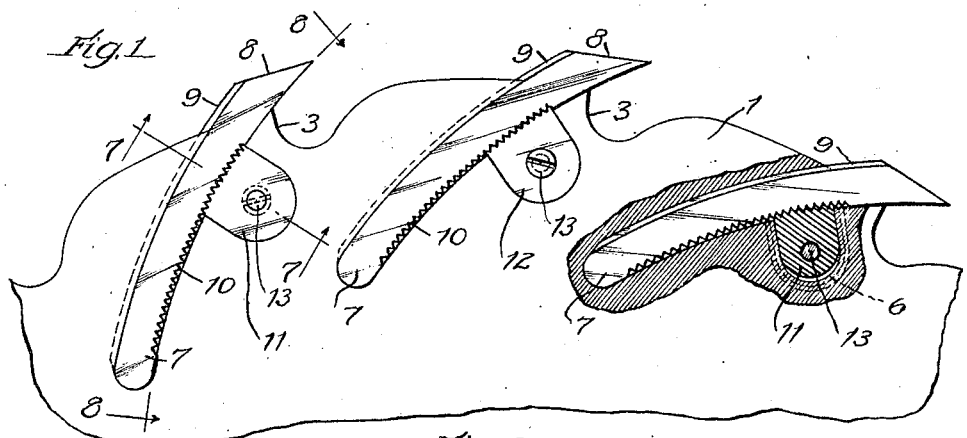
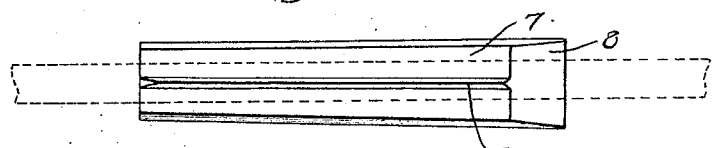
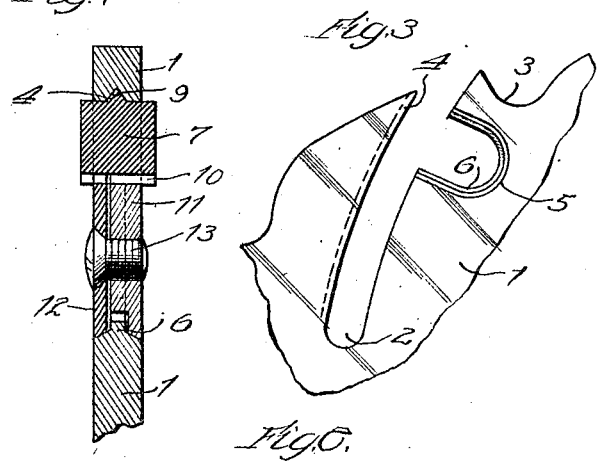
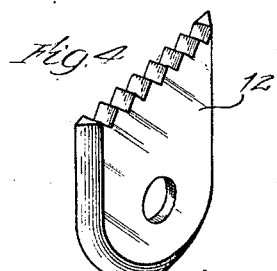
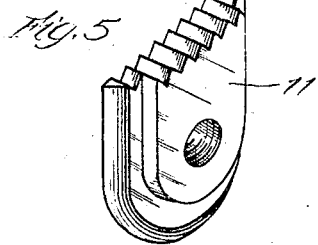
Inventor:
Anton Westgard
Mason, Fenwick & Lawrence
Attys Patented June 12, 1923.

1,458,671

UNITED STATES PATENT OFFICE.

ANTON WESTGARD, OF CHICAGO, ILLINOIS, ASSIGNOR OF ONE-HALF TO ANNA H. WESTGARD, OF CHICAGO, ILLINOIS.

SAW CONSTRUCTION.

Application filed December 31, 1921. Serial No. 526,217.

*To all whom it may concern:*

Be it known that I, ANTON WESTGARD, a citizen of the United States, residing at Chicago, in the county of Cook and State of Illinois, have invented certain new and useful Improvements in Saw Constructions; and I do hereby declare the following to be a full, clear, and exact description of the invention, such as will enable others skilled in the art to which it appertains to make and use the same.

The present invention relates particularly to an improvement in a saw having detachable teeth and is applicable to other tools having detachable working parts.

Primarily, the object of my invention is to provide an improved saw, one in which the teeth are adapted to do better work and give longer wear, and in which such teeth may be tightly locked against displacement.

Secondarily, it is my object to provide for adjustment of the working part of a tool compensatory with the wear thereupon, and to enable rapid displacement and replacement of worn or damaged parts.

Additionally, it is my object to provide a new and improved type of detachable saw tooth and a better means for locking same in operable position.

These and such other object as may hereinafter appear are attained by the novel construction, combination and arrangement of parts to be more specifically set forth in the description which follows. Reference will now be had to the accompanying drawing, forming a part of this specification, and in which:—

Figures 1 and 2 are fragmentary side and edge views of my circular saw blade showing several teeth attached therein;

Figure 3 is a detail of a saw blade with the tooth and locking parts removed;

Figures 4 and 5 are enlarged views of the locking members which I employ;

Figure 6 is a plan view of a complete saw tooth; and

Figures 7 and 8 are sections along the lines 7—7 and 8—8, respectively, of Figure 1, looking in the direction of the arrows.

Like reference characters are used to designate similar parts in the drawing and in the description of my invention.

The ordinal 1 designates a saw blade provided with a number of regularly arranged curved inwardly extending slots 2. Adjacent to the front walls of the slots 2, the saw blade is cut away as indicated by the numeral 3 to provide shaving clearance.

The back wall of each slot 2 is provided with a centrally disposed V-shaped groove 4 which is disposed at an angle to the plane of the saw blade, of about one-half of one degree, first to one side and then to the other, as is indicated in Figure 2.

The front wall of the slot 2 is cut away to form a recess 5, the walls of which have inclined beveled surfaces and a central ridge or shoulder 6.

The body 7 of each tooth is curved to conform to the back wall of the slot 2 and is wedge-shape in plan, the cutting head or wide part 8 of the wedge constituting the cutting edge and the sides of the body being bevelled on both sides to provide rake or clearance as will be readily understood.

Extending centrally of the length of the back surface of each tooth 7 is a V-shaped tongue or rib 9, and on the front surface of the body 7, some distance below the cutting edge 8, is a number of transverse serrations or teeth 10.

For locking a tooth 7 within the slot 2, I employ two U-shaped members or plates 11 and 12 and a connecting screw. Both of these plate members have bevelled edges for cooperative engagement with the bevelled walls of slot 5, the plate 11 being thicker than plate 12 and slidable in the U-shaped recess formed by the ridge 6 and also threaded to receive a screw bolt 13 which passes through and has its head seated in the plate 12. The tops or tooth engaging portions of members 11 and 12 have aligned serrations corresponding in width and shape to serrations 10 in tooth 7.

Inasmuch as the grooves 4 in the back wall of the slots 2 are not parallel to the plane of the saw blade 1 the saw teeth will be divided into two groups, viz, right and left hand teeth which differ from each other primarily in that the serrations 10 are disposed at opposite angles on the front face of the two groups of teeth, the serrations 10 being so disposed across the face of a tooth that they will align with the serrations in the plates 11 and 12. However the teeth may be made substantial duplicates and the serrations in the plates 11 and 12 cut on a slight angle so as to properly register with the serrations on the teeth as will be readily understood.

In assembly, teeth are manually inserted into slots 2. Right hand teeth are forced home in slots having a right inclined groove 4 and left hand teeth into slots with a left inclined groove 4. For right handed teeth, locking member 12 is placed upon the right and member 11 upon the left side of slot 5. Screw 13 is turned home through member 11 and for greater security, may be struck by a center punch to expand its metal into the threads of locking member 11. Left hand teeth, of course, require opposite assembly. Locking members 11 and 12 are reversible.

It is manifest that teeth 7 may be inserted and removed at will and that as they wear off may be extended outwardly to compensate for wear. By inclining the grooves 4, the high point of the cutter or tooth 7 may be maintained at a predetermined distance away from the side of the blade 1. Adjustment with respect thereto is of course possible.

The locking mechanism described is exceedingly simple and secure and the rib 9 upon tooth 7 and the complementary groove 4 prevent any lateral displacement of the tooth no matter how severe the strain thereon.

By the arrangement of right and left hand tapered teeth 7 with opposing high points and the inclined grooves 4 in the teeth slots 2, a clearance for teeth and fastening members is provided. There is no danger of binding and friction with its resulting burning of the saw or its teeth.

The use of a high-speed steel in the detachable teeth 7 permits of long wear and genuinely improved cutting points, such teeth generally being hardened about one-half of their length from the cutting point to admit of use so long as there is sufficient serrated body left to be engaged by the locking members 11 and 12.

The invention has been shown in connection with a circular saw but it is equally applicable to a band saw or other straight-edge saw and the teeth need not necessarily be curved to the successful operation of the invention.

Having thus described my invention, what I claim is new and desire to secure by Letters Patent of the United States, is:—

1. In a saw, a body provided with recesses to receive saw teeth and locking means therefor, saw teeth, and a locking means comprising serrated members adapted to be forced against said saw tooth by engagement with said saw body as said members are drawn one toward another.

2. The combination of a saw blade having an open-ended slot therein and having a second slot opening onto the first slot, a saw tooth in the first-mentioned slot, a pair of clamping plates disposed on opposite sides of the other slot, and means acting to move said plates toward the tooth when said plates are moved toward each other.

3. The combination of a saw blade having an open-ended slot therein and having a second slot opening onto the first slot and having a curved bottom, a saw tooth in the first-mentioned slot, a pair of clamping plates disposed on opposite sides of the other slot, said plates and the bottom of said last-mentioned slot having complementary inclined faces, and means for drawing said plates toward each other and into engagement with the tooth.

4. The combination of a saw blade having an open-ended slot therein and having a second slot opening onto the first slot, a saw tooth in the first-mentioned slot, a pair of clamping plates disposed on opposite sides of the other slot, ridges extending along the side walls of the last-mentioned slot, one of said plates being slidably mounted between said ridges, and means acting to move said plates toward the tooth when the plates are moved toward each other.

5. The combination of a saw blade having an open-ended slot therein and having a second slot opening onto the first slot and having a curved bottom, a saw tooth in the first-mentioned slot, a pair of clamping plates disposed on opposite sides of the other slot, said plates and the bottom of said last-mentioned slot having complementary inclined faces, a ridge extending along the side walls of said last-mentioned slot, one of said plates being slidably mounted between the extensions of said ridge, and means acting to move said plates toward the tooth when the plates are moved toward each other.

6. The combination of a saw blade having an open-ended slot therein and having a second slot opening onto the first slot, a saw tooth in the first-mentioned slot, a pair of clamping plates disposed on opposite sides of the other slot, serrations in the tooth body opposite said last-mentioned slot, complementary serrations on the adjacent ends of said plates, and means acting to move said plates into engagement with the tooth when said plates are moved toward each other.

7. The combination of a saw body having a curved slot for the reception of a saw tooth, a curved saw tooth adjustably and removably mounted in said slot, and means for pressing said tooth against one curved wall of said slot, said means including a pair of cooperating beveled plates adapted to form a portion of the saw body.

8. The combination of a saw body having a curved slot for the reception of a saw tooth, one of the walls of the slot having a groove therein, a curved saw tooth adjustably and removably mounted in said slot, a rib extending along the convex edge or back of the tooth and adapted to slidably fit in said groove, and means for pressing said tooth against one curved wall of said slot and pressing the said rib into said groove, said means including a pair of co-operating plates adapted to form a portion of the saw body.

9. The combination of a saw body having a slot, a notch opening into the slot, the walls of said notch being beveled, one of the walls of said slot being concaved and having a longitudinally extending groove therein, a tooth having a curved back and a longitudinally extending rib on its back, means acting on the tooth intermediate its ends for forcing the curved back of the tooth into close contact with the concave wall of the slot, said means including a pair of beveled plates adapted to be positioned in said notch, and locking means for the plates, said locking means including a bolt rotatably mounted in one plate, and screw-threadedly mounted in the other plate.

10. The combination of a saw body having a slot, a notch opening into the slot, the walls of said notch being beveled from each face of the saw body, one of the walls of said slot being concaved and having a longitudinally extending groove therein, a tooth having a curved back and a longitudinally extending rib on its back, and means acting on the tooth intermediate its ends for forcing the curved back of the tooth into close contact with the concave wall of the slot, said groove and rib cooperating to dispose said tooth at an angle to the plane of the saw body, said means including a pair of beveled plates adapted to be locked into position in said notch and corresponding respectively with the beveled edges.

In testimony whereof I affix my signature.

ANTON WESTGARD.